United States Patent
Fautz et al.

(10) Patent No.: US 11,059,139 B2
(45) Date of Patent: Jul. 13, 2021

(54) DRILLING-MILLING DEVICE HAVING A DEVICE FOR EVENING OUT THE TORQUE AND THE ROTATIONAL SPEED OF THE SPINDLE

(71) Applicant: WTO Vermoegensverwaltung GmbH, Ohlsbach (DE)

(72) Inventors: Tobias Fautz, Zell am Harmersbach (DE); Thomas Kreutzer, Grafenhausen (DE); Karlheinz Jansen, Schutterwald (DE)

(73) Assignee: WTO Vermoegensverwaltung GmbH, Ohlsbach (DE)

( * ) Notice: Subject to any disclaimer, the term of this patent is extended or adjusted under 35 U.S.C. 154(b) by 0 days.

(21) Appl. No.: 16/333,610

(22) PCT Filed: Oct. 4, 2017

(86) PCT No.: PCT/EP2017/075253
§ 371 (c)(1),
(2) Date: Mar. 15, 2019

(87) PCT Pub. No.: WO2018/065488
PCT Pub. Date: Apr. 12, 2018

(65) Prior Publication Data
US 2019/0255670 A1  Aug. 22, 2019

(30) Foreign Application Priority Data
Oct. 4, 2016  (DE) .................. 10 2016 118 766.6

(51) Int. Cl.
*B23B 29/24*  (2006.01)
*B23Q 1/52*  (2006.01)
(Continued)

(52) U.S. Cl.
CPC .............. *B23Q 5/56* (2013.01); *B23B 29/242* (2013.01); *B23Q 1/522* (2013.01); *B23Q 5/045* (2013.01);
(Continued)

(58) Field of Classification Search
CPC ............. F16D 57/00; F16D 57/02; F16F 9/12
(Continued)

(56) References Cited

U.S. PATENT DOCUMENTS 1,990,035 A  2/1935  Kratz
2,931,464 A  4/1960  Kurt
(Continued)

FOREIGN PATENT DOCUMENTS

BE   437 356 A   1/1940
CH   163074 A    10/1933
(Continued)

OTHER PUBLICATIONS

Machine Translation of JP 11-090755 A, which JP '755 was published Apr. 1999.*

(Continued)

*Primary Examiner* — Erica E Cadugan
(74) *Attorney, Agent, or Firm* — Aslan Law, P.C.

(57) ABSTRACT

A drilling-milling device comprising a housing; a drive shaft; a spindle; and a brake. The drive shaft and the spindle being coupled to one another by a gear mechanism, and the brake being coupled to the spindle and a braking torque of the brake being transmitted to the housing.

18 Claims, 9 Drawing Sheets

(51) Int. Cl.
*B23Q 5/04* (2006.01)
*F16D 57/02* (2006.01)
*B23Q 5/56* (2006.01)
*B23Q 11/12* (2006.01)
*F16H 57/12* (2006.01)
*F16D 57/00* (2006.01)

(52) U.S. Cl.
CPC .............. *B23Q 11/12* (2013.01); *F16D 57/00* (2013.01); *F16D 57/002* (2013.01); *F16H 57/12* (2013.01); *B23Q 2705/005* (2013.01); *Y10T 29/5155* (2015.01); *Y10T 409/307672* (2015.01)

(58) Field of Classification Search
USPC .......................... 188/290–296; 384/490–547
See application file for complete search history.

(56) References Cited

U.S. PATENT DOCUMENTS

| | | | | |
|---|---|---|---|---|
| 3,512,440 | A * | 5/1970 | Frydmann | F16D 57/04 83/491 |
| 4,435,110 | A * | 3/1984 | Hunkeler | B23F 5/22 409/11 |
| 4,664,536 | A * | 5/1987 | Kamman | F16C 35/12 384/99 |
| 4,856,153 | A * | 8/1989 | Gusching | B23B 29/046 29/26 A |
| 5,188,493 | A * | 2/1993 | Heel | B23Q 5/045 409/230 |
| 2010/0252292 | A1* | 10/2010 | Pyles | B23Q 5/20 408/124 |
| 2013/0336603 | A1* | 12/2013 | Matsunaga | B23Q 1/38 384/101 |
| 2014/0360745 | A1* | 12/2014 | Matsunaga | B23Q 5/04 173/162.1 |
| 2015/0268123 | A1* | 9/2015 | Haimer | G01M 1/04 73/487 |

FOREIGN PATENT DOCUMENTS

| | | |
|---|---|---|
| DE | 1 098 328 B | 1/1961 |
| DE | 39 09 231 A1 | 9/1990 |
| DE | 39 30 787 C2 | 5/1992 |
| DE | 101 14 183 A1 | 6/2002 |
| DE | 10 2012 216 496 A1 | 3/2014 |
| DE | 202015008987 U1 | 6/2016 |
| DE | 102017008360 A1 * | 3/2019 |
| EP | 0 094 392 A1 | 11/1983 |
| EP | 1 900 969 A2 | 3/2008 |
| JP | 62-151638 A * | 7/1987 |
| JP | 05-277806 A * | 10/1993 |
| JP | 11-090755 A * | 4/1999 |
| WO | WO 2015/145345 A1 * | 10/2015 |
| WO | WO2016020796 A1 | 2/2016 |

OTHER PUBLICATIONS

Mechanical Engineering Design, 4th ed., pp. 484-488, copyright 1993.*
Machinery's Handbook, 25th ed., pp. 2159-2167, copyright 1996.*
Machine translation of DE 3909231 A1, which DE '231 was published Sep. 27, 1990.*

* cited by examiner

Fig. 4  Detail x

Drive Shaft Comprising Driving Teeth

Fig. 9

DRILLING-MILLING DEVICE HAVING A DEVICE FOR EVENING OUT THE TORQUE AND THE ROTATIONAL SPEED OF THE SPINDLE

CROSS-REFERENCE TO RELATED APPLICATIONS

This application claims priority to German Patent Application No. 10 2016 118 766.6 filed on Oct. 4, 2016, and to PCT Application No. PCT/EP2017/075253 filed on Oct. 4, 2017, the entire contents of which are hereby incorporated by reference.

The invention relates to a drilling and/or milling device which is fastened to a tool holding fixture of a numerically controlled machine tool, in particular a turning center or a machining center. Turning centers are often equipped with a tool turret. This field of use is a main field of application of the device according to the invention; however, the invention is not restricted thereto and can be used in all tool holding fixtures of numerically controlled machine tools.

A power tool of this kind is known from DE 39 30 787 C2, for example. It comprises a spindle in which the tool is received and a drive shaft which is driven by means of a drive shaft of the machine tool.

DE 20 2015 008 987 U1 discloses a further generic embodiment of a drilling-milling device. These drilling and/or milling devices are not restricted to drilling and milling. In principle, any desired tool can be clamped into the spindles of these devices. The name "drilling-milling device" will be used in the following for the sake of linguistic simplicity, without intending to restrict the field of use of the device according to the invention to these machining processes.

These drilling-milling devices are built such that the spindle and the drive shaft are often arranged at right angles to one another. Other angles+/−β that deviate from 90° or angles+/−β that can also be adjusted in this additional plane (−180° to 0° to +180°) are likewise possible and are already known from power tools that are available on the market. The angle β is explained in more detail below with reference to FIG. 8.

If the angle is β=0° or =180°, the rotational axes of the spindle and the drive shaft are in parallel. If an angle is β=0°, the tool points away from the machine holding fixture. If an angle is β=180°, the tool points towards the machine holding fixture. With these angles β, the spindle and the drive shaft usually have an axial offset, and a spur gear mechanism transmits power from the drive shaft to the spindle. In the specific case where the angle β=0° and the axial offset likewise=0°, the gear mechanism is not required, and the drive shaft is part of the spindle at the same time.

The axis of the spindle is also pivotable (angle+/−α) relative to the axis of the drive shaft, such that slanted holes, surfaces or profiles can also be produced. The pivot angle α is explained in more detail below with reference to FIGS. 1 and 7.

The increasing requirements for efficient machining production on turning or machining centers and other numerically controlled machine tools comprising power tools are associated with ever greater requirements in terms of the quality or the precision with which the workpieces can be produced.

The problem addressed by the invention claimed is that of providing a drilling-milling device which achieves an even greater cutting capacity and/or an improved quality of the machined surfaces for a wide range of applications. At the same time, the operational life of the tool and the service life of the drilling-milling device are intended to be significantly increased.

In the case of a drilling-milling device that comprises a housing, a drive shaft and a spindle, the drive shaft and the spindle being coupled to one another by means of a gear mechanism, this problem is solved by the drilling-milling device comprising a device for evening out the torque and/or the rotational velocity of the spindle and by said device being coupled to or integrated into the spindle.

In a first embodiment, the evening-out of the torque and/or the rotational velocity of the spindle is achieved by means of an increased flywheel mass of the spindle itself or by means of an additional mounted flywheel mass that is connected to the spindle. The desired large mass moment of inertia of the spindle or of the flywheel mass can be achieved by means of the geometry of the spindle and the flywheel mass (diameter, length). Furthermore, by using materials with a particularly high relative density, for example lead, tantalum or tungsten, a large mass moment of inertia can be achieved in very compact dimensions.

The damping action of this flywheel mass can be further increased if the flywheel mass is designed as a dual-mass flywheel. A resilient (spring) element is provided between the two flywheel masses. This principle is known from the field of automotive engineering in the form of dual-mass flywheels or dual-mass clutches.

In an enhanced embodiment, the mass distribution of the flywheel mass can be adjusted. The more remote the mass is from the rotational axis of the spindle, the greater the mass moment of inertia. As a result, the evening-out action of the flywheel mass is also adjusted. In particular, the eigenfrequencies of the "tool, spindle, flywheel mass and drive shaft" system are adjusted in a targeted manner by changing the mass moment of inertia of the flywheel mass such that the machining quality and/or the operational life of the tool is optimized. The two target variables cannot always be optimized at the same time. Consequently, one target variable has to take priority.

This change to the flywheel mass is made ideally during the operation of the drilling-milling device according to the invention when the spindle and the drive shaft are rotating.

These adjustments are controlled by a control loop that processes signals from suitable sensors (rotational speed, torque, temperature, vibrations) and determines the most favorable distribution of the flywheel mass according to the "optimization of the machining quality and/or service life of the cutting tools and/or service life of the drilling-milling device" target variable/s.

In a second, preferred embodiment, the desired evening-out is achieved by means of a brake that is coupled to the spindle and transmits the braking torque to the housing of the drilling-milling device.

By means of the brake, the torques resulting from the cutting that are transmitted from the drive shaft to the spindle are, from the outset, superimposed by a braking torque that is independent of the cutting. This braking torque causes a torque to always be transmitted from the drive shaft to the spindle during the machining, even if the cutting is carried out with an interrupted cut. As a result, in a toothed gearing between the drive shaft and the spindle, the same faces of the tooth flanks of the gears involved always remain in contact. The pressing force with which the tooth flanks are pressed together can be adjusted by means of the braking torque. This pressing force leads to the elimination of a backlash which, for production reasons, is always present between the engaged gears of the gear mechanism, and thus does not affect the precision of the machining of a workpiece.

In addition, the bearing systems are preloaded before the cutting process by the braking torque produced by the brake. This further improves the machining quality. The use of the drilling-milling device according to the invention in turning or machining centers that are already available and in production results in clear improvements in the machining quality and the service life of the cutting tools and the drilling-milling device.

In an enhanced embodiment, the braking action can be adjusted, as a result of which the superimposed torque is adapted. These adjustments are established by a control loop that processes signals from suitable sensors (rotational speed, torque, temperature, vibrations) and optimizes same with respect to the machining optimization and/or the service life of the cutting tools and/or the service life of the drilling-milling device.

It is also possible to use the drilling-milling device according to the invention in hob peeling by means of this brake. Hob peeling very particularly depends on an accurate coordination of the position of the rotational angle of the workpiece or the workpiece spindle with the position of the rotational angle of the tool which is clamped in the spindle of the drilling-milling device according to the invention.

In principle, all known braking devices, such as any type of friction brakes (e.g. drum brakes, shoe brakes, disk brakes), magnetic brakes, electric brakes, hydrodynamic brakes and fluid brakes, can be used as the brake.

In an advantageous embodiment of the drilling-milling device according to the invention, a viscous coupling known from the prior art is used as the brake. A coupling usually interconnects two shafts, whereas, when used according to the invention as a brake, one face of the coupling is coupled directly or indirectly to the spindle and the other face of the coupling is connected to the housing. A viscous coupling of this kind comprises two groups of plates which are arranged so as to be at a small axial distance from one another.

According to the invention, the first group of plates is connected to the spindle for conjoint rotation. The second group of plates is conjoined with the housing of the drilling-milling device. A fluid medium (e.g. an oil or fat, or a rheological fluid, which is a fluid of which the viscosity changes if the field strength of a magnetic field to which the fluid is exposed changes) having a high viscosity is located in the gaps between the two groups of plates. Shear stress between the plates of the first group and the plates of the second group results from this when the spindle is driven. This results in the desired braking torque.

An advantage of this viscous coupling that is repurposed as a brake can be considered to be that of being able to easily and also retroactively adjust the braking action of the brake. This takes place by changing the filling amount and/or the viscosity of the fluid medium (e.g. oil or fat). Advantageously, silicone oils that can be purchased on the market with different viscosities can be used.

If more silicone oil is poured in, the braking action is increased when the viscosity is the same. Of course, it is also possible to deactivate the brake by removing the silicone oil in its entirety from the brake.

The silicone oil can be easily replaced by unscrewing a screw plug from the housing and draining or sucking out the silicone oil present and pouring in new silicone oil or another fluid medium.

Furthermore, the braking action can be set by adjusting the number of plates and the distance between the plates, and adjusting the geometric form of the plate geometry.

If the viscous brake is filled with a rheological fluid, the braking action can be easily controlled by applying or adjusting a magnetic field that captures the brake.

Furthermore, retarder couplings that are known from the coupling industry can be used as fluid brakes. One face of said retarder couplings is conjoined with the housing rotation; the other face is connected to the spindle.

The amount of the fluid in a viscous coupling or a retarder—and therefore the braking action also—can also be changed during operation.

Alternatively, it is also preferably possible for the evening-out according to the invention to be achieved by means of a magnetic brake or for an electric generator to be used. Preferably, both the magnetic brake and the electric generator can be controlled such that, in this case too, it is easy to set the braking torque and therefore the damping according to requirements. If an electric generator is used as the brake, then the mechanical energy output when the spindle is braked can be converted back into electrical energy (recovery).

Coupling the machine control system and connected sensors (e.g. (torsional) vibration, rotational speed and/or torque sensors) to the electronic controls of the magnetic brake or of the electric generator can result in a monitored and controlled braking action in order to achieve optimal workpiece surfaces and the above-described increased operational life of the cutting tools.

Since mechanical energy is converted into heat energy in the brake according to the invention, it is advantageous if the brake according to the invention is actively cooled. Particularly advantageously, this can occur by the drilling-milling device comprising an internal cooling-lubricant supply and the brake being cooled by the cooling lubricant that flows through the cooling-lubricant supply. Cooling-lubricant supplies have been part of the prior art in efficient drilling-milling devices for many years. According to the invention, the cooling-lubricant lines in the housing of the drilling-milling device should be positioned so that they actively cool the brake. This cooling lubricant, which is heated by a few degrees Celsius, then fulfills its actual purpose, namely cooling and lubricating the cutting tool or the workpiece. The increase in the temperature of the cooling lubricant by a few degrees Celsius caused by the heat absorption at the brake does not affect its suitability as a cooling lubricant. This type of active cooling is therefore not only very efficient, but also very cost-effective.

The drilling-milling device according to the invention is suitable for being used in a wide range of turning centers and machining centers. In particular, it is compatible with all conventional mechanical interfaces of star, disk and crown turrets. The drilling-milling device according to the invention can therefore be used in turning centers or machining centers from a wide range of manufacturers.

This compatibility of the drilling-milling device according to the invention also applies to the drive shaft. The drive shaft is formed at its end facing towards the turret in such a way that it can be driven by the turret. For this purpose, it can be equipped with a dihedron, for example. However, there are also turrets that comprise inner teeth on the driven shaft thereof. Correspondingly, the drive shaft of the drilling-milling device according to the invention comprises external teeth. As already mentioned, all variants that allow a drilling-milling device according to the invention to be mounted on a turret available on the market are possible with respect to the interface between a turret and the driven drilling-milling device. The drilling-milling device according to the invention can of course also be easily adapted to mechanical interfaces appearing on the market in the future.

In order to further expand the field of use of the drilling-milling device according to the invention, the drilling-milling device comprises a pivoting means. Said means makes it possible to pivot the spindle about a rotational axis of the drive shaft. This is frequently necessary when drilling or milling. Such pivotability is also needed for hob peeling. Pivoting means of this kind are known from the prior art.

In a further advantageous embodiment of the invention, the spindle of the drilling-milling device according to the invention comprises a tool holding fixture. All tool holding fixtures available on the market can be used. It is of course a prerequisite for the tool to be tensioned with sufficient accuracy and securely clamped in order to be able to transmit the driving power and forces necessary for machining. Collets, expansion chucks, hollow-shank taper holders (such as HSK, PSC, Coromant Capto®, KM) and milling arbor holders have been proven to be particularly suitable tool holding fixtures.

Further advantages and advantageous embodiments of the invention can be found in the following drawings, the description thereof and the claims.

The drawings show an embodiment in different views. All of the reference numerals are therefore the same across the drawings.

Figure 1:
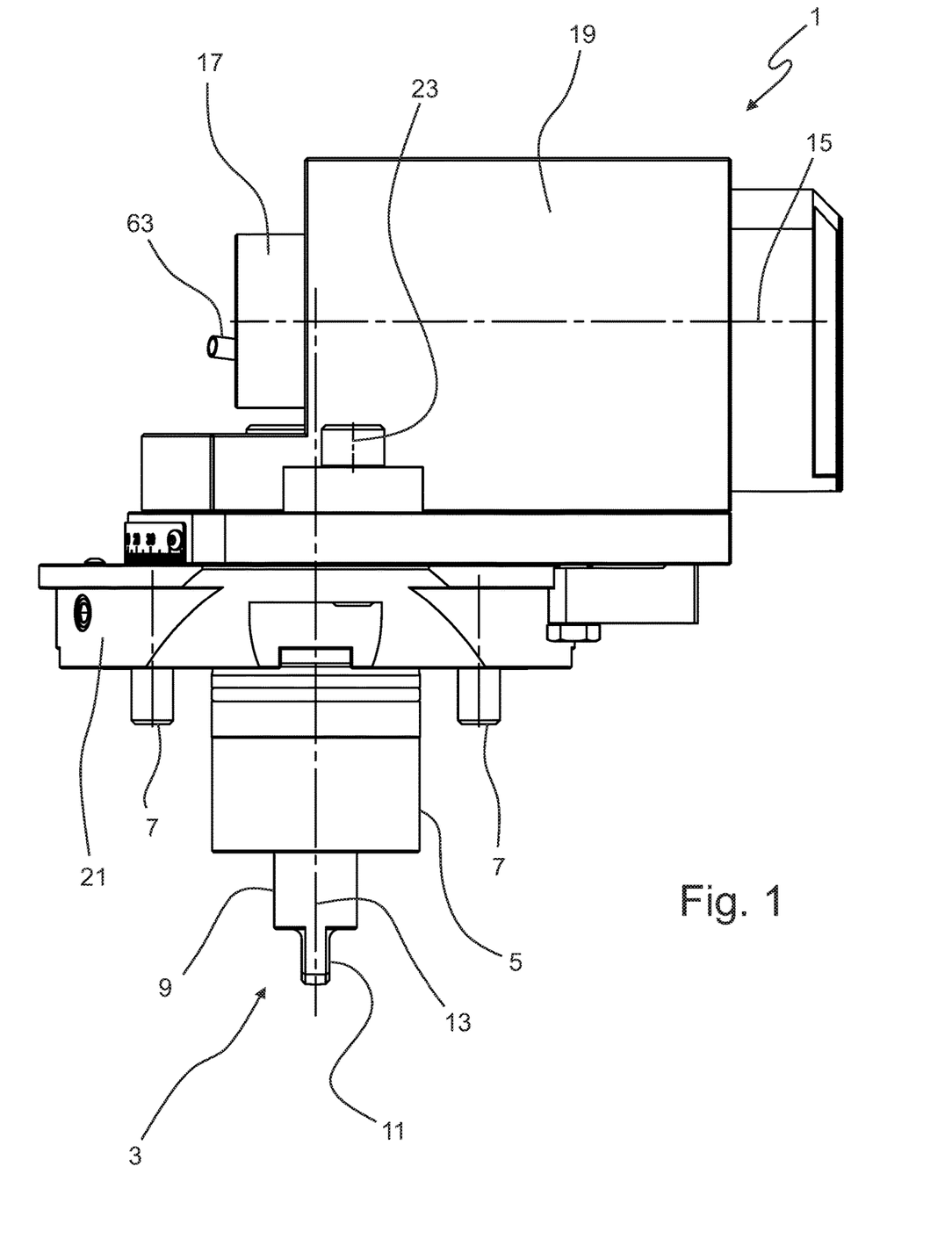
FIG. 1 is a side view of an embodiment of a drilling-milling device according to the invention.

FIG. 1 is a side view of a drilling-milling device 1 according to the invention. The drilling-milling device 1 comprises a mechanical interface 3 that is compatible with a turret of a turning center or machining center (not shown). In this embodiment, the mechanical interface 3 comprises a cylindrical portion 5 and a plurality of grooves (not shown in FIG. 1). The cylindrical portion 5 and the grooves that interact with corresponding counterparts on the turret side accurately position the drilling-milling device 1 on a turret (not shown). Furthermore, the forces and torques acting between the drilling-milling device 1 and the turret are also transmitted. The drilling-milling device 1 is screwed to the turret by means of the screws 7.

Since the drilling-milling device 1 is a power tool, a drive shaft 9 is formed in the region of the mechanical interface 3 and, in this embodiment, comprises a dihedron 11 on its end that is at the bottom in FIG. 1. A rotational axis of the drive shaft is denoted by 13. The necessary driving power is transmitted from the turret to the drive shaft 9 by means of said dihedron 11, which engages in a complementary groove of a driven shaft of the turret (not shown). This part of the mechanical interface between the drilling-milling device 1 and the turret is also known from the prior art. Furthermore, the mechanical interface 3 of the drilling-milling device 1 according to the invention is not restricted to this embodiment, but can be adapted to all tool holding fixtures of numerically controlled machine tools that are available on the market and will be on the market in the future, in particular turning centers or machining centers and the interface thereof for power tools.

In this embodiment, the cylindrical portion 5 and the drive shaft 9 are arranged concentrically to one another.

In FIG. 1, a rotational axis 15 of a spindle 17 extends horizontally. The rotational axes 13 and 15 thus form a right angle ($\beta=90°$).

The tool (not shown) necessary for machining is clamped to the left-hand end of the spindle 17 in FIG. 1.

The spindle 17 is rotatably mounted in a housing 19 of the drilling-milling device 1. A brake (not shown in FIG. 1) according to the invention is installed at the right-hand end of the housing 19 in FIG. 1. The housing 19, along with the spindle 17, can be pivoted about the rotational axis 13 relative to the mechanical interface 3. For this purpose, a rotary table 21 is provided below the housing 19 and is rigidly connected to the mechanical interface 3 for the machine-side turret or to another tool holding fixture. The housing 19 is placed and rotatably mounted on the upper face of the rotary table 21. The housing 19 can be secured to the rotary table 21 in a pivoting position that is set once by means of clamping brackets and clamping screws 23. This type of pivot mounting is known from machine vices and other tools, for example. The design details of said pivoting means are therefore not explained in more detail. In order to be able to directly read off the set pivot angle α, a scale is arranged on the housing 19.

As a result of this design, the rotary table 21 can be fastened to the turret beforehand by means of the screws 7. It is therefore not problematic if said screws 7 are no longer accessible after assembling the housing 19 on the rotary table 21. In a further step, the housing 19 is fastened to the rotary table 21 independently of the positions of the screws 7 by means of the aforementioned clamping brackets and clamping screws 23.

Figure 2:
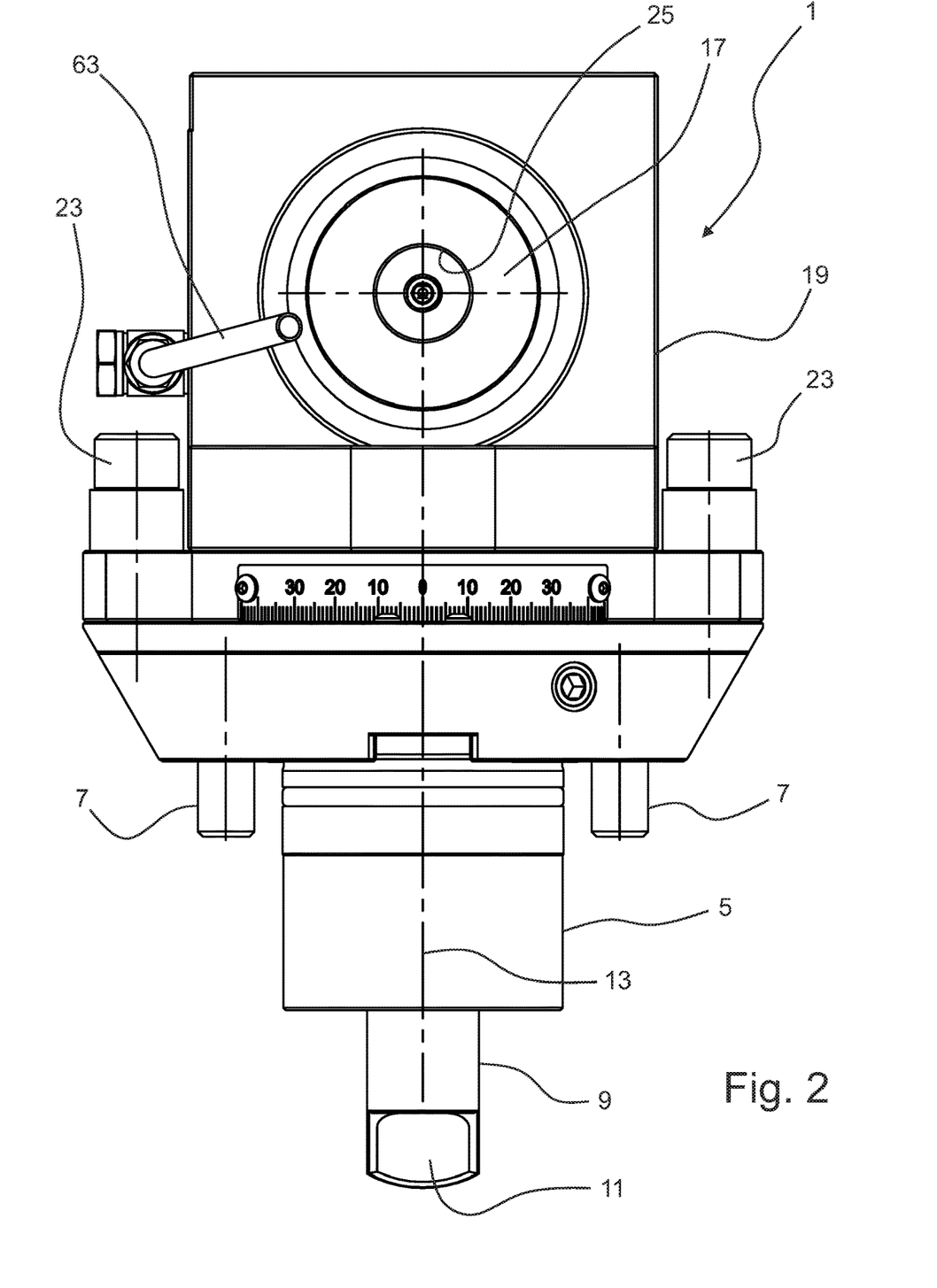
FIG. 2 is a front view of the spindle of the drilling-milling device according to the invention.

FIG. 2 is a front view of the drilling-milling device 1. In this view, the spindle 17 comprising a tool holding fixture 25, the mechanical interface 3, the pivoting means comprising the rotary table 21 and the scale for reading off the pivoting angle α can be seen clearly.

In this embodiment, the tool holding fixture 25 is designed as an expansion chuck. This allows for very accurate concentricity and short tool-change times. Nevertheless, other embodiments of tool holding fixtures are also possible. In particular, it is possible to tension the tools (not shown) in the spindle 17 or the tool holding fixture 25 by means of a collet holder (also not shown).

Figure 3:
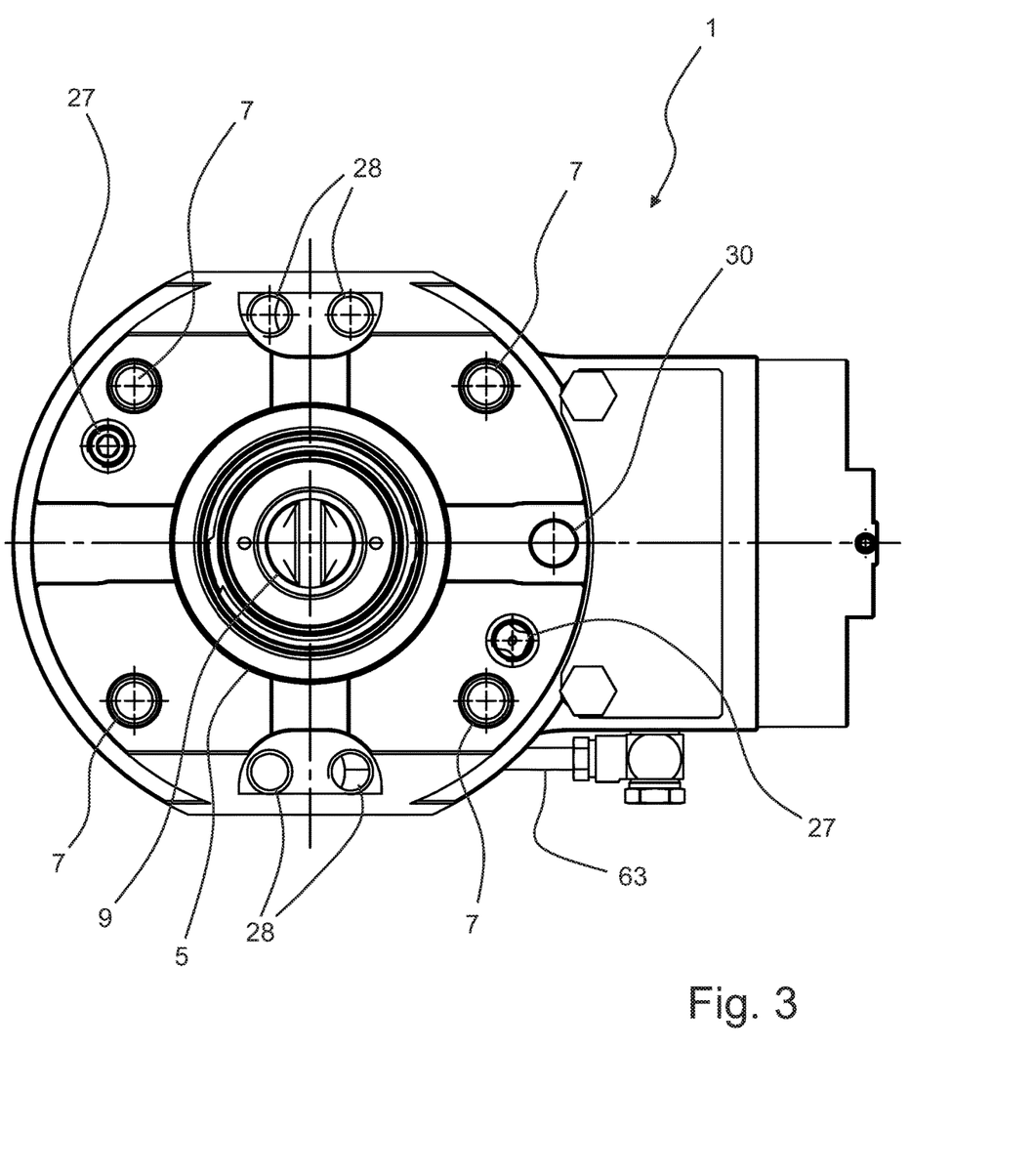
FIG. 3 is a view from below of the drilling-milling device according to the invention.

FIG. 3 is a view from below of the drilling-milling device according to the invention. In this view, the mechanical interface 3 can be seen clearly. In particular, the cylindrical portion 5, the drive shaft 9 comprising the dihedron 11, and the screws 7 can be seen clearly. At least one hole is also provided in the mechanical interface 3. This hole is part of the cooling-lubricant supply 27 and has therefore been provided with reference numeral 27.

The turret or the tool holding fixture of the machine tool comprises a similar hole at the opposite point and conveys the cooling lubricant into the hole 27. In order for the drilling-milling device 1 to be offset by 180° and operated on the tool holding fixture, a second hole 27 is provided opposite the first hole 27 in the drilling-milling device 1. The hole 27 that is not needed is then optionally closed by a set screw.

FIG. 3 also shows four threaded holes 28. The clamping screws 23 are screwed into the threaded holes 28. A hole 30 is present in the groove. A pin can be inserted into said hole 30 when the drilling-milling device is intended to be locked at a pivot angle α=0°.

Figure 4:
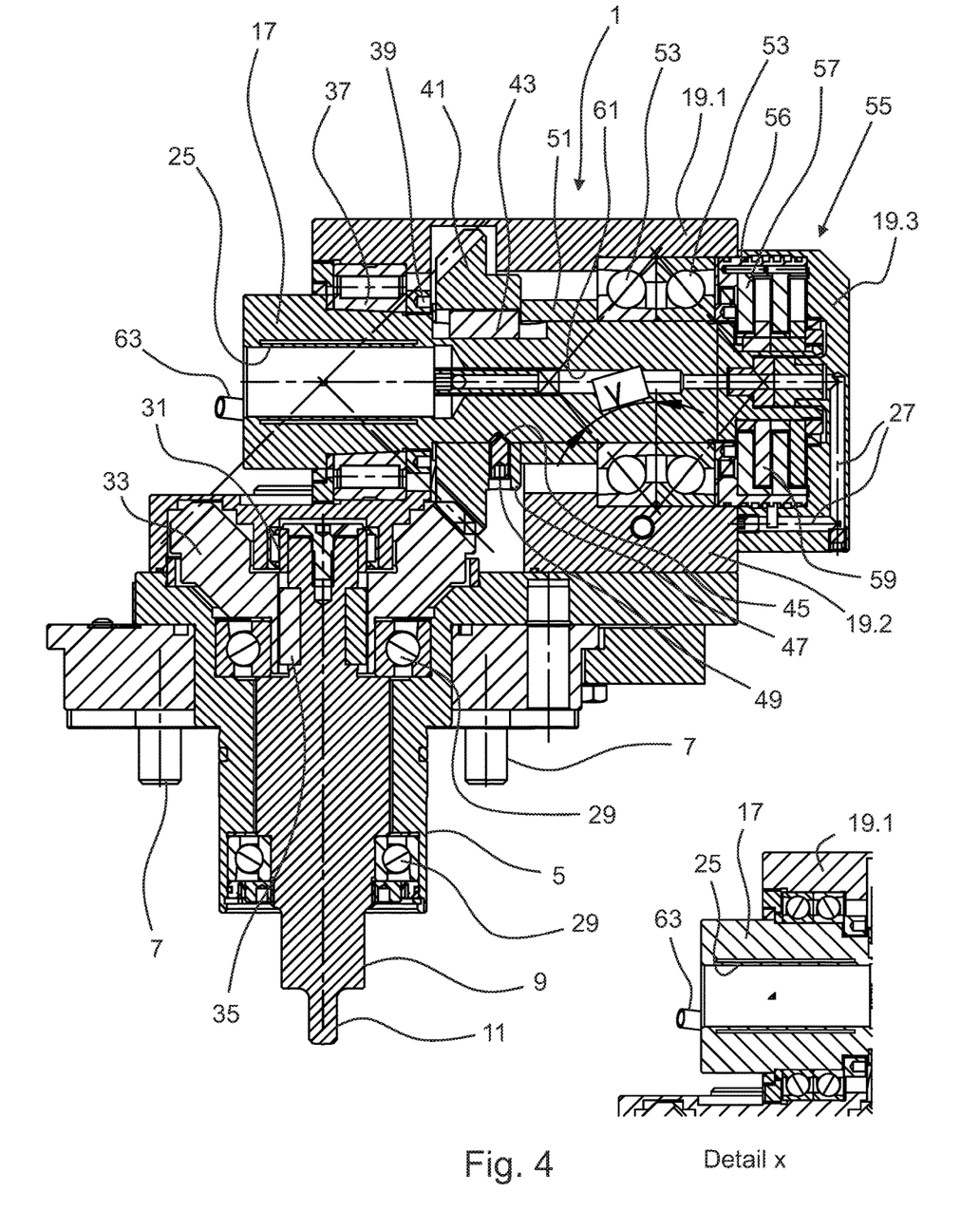
FIG. 4 is a cross section through a drilling-milling device according to the invention.

FIG. 4 shows a cross section of the drilling-milling device 1 according to the invention. It is clear from FIG. 4 that the drive shaft 9 is rotatably mounted in the cylindrical portion 5 or in the housing 19 by means of a total of three roller bearings, namely two angular contact ball bearings 29 and a support bearing 31. The bearing assembly comprising the additional support bearing 31 is used to minimize the deflection of the first bevel gear 33 resulting from the gear forces as much as possible, in order to reduce the deviation of the rotational angle resulting from the displacement as much as possible and to additionally dampen vibrations occurring in the drive train.

A first bevel gear 33 is connected for conjoint rotation to the drive shaft 9 at the end of the drive shaft 9 that is at the top of FIG. 4. This occurs by means of longitudinal grooves and feather keys 35 in a manner known per se. The longitudinal grooves in the drive shaft 9 do not have a reference numeral.

The spindle 17 is mounted in the region of the tool holding fixture 25 in zero-clearance bearings. This mounting can be achieved by an O-shaped arrangement of angular contact ball bearings, for example. This design variant is shown in detail "X". In order to further increase the radial rigidity of the mounting, the spindle 17 can be mounted in the region of the tool holding fixture 25 in a cylindrical roller bearing 37, as is shown in FIG. 4.

The inner ring of the cylindrical roller bearing 37 is slightly conical in this embodiment. In a complementary manner, the spindle 17 is in the shape of a frustum in said region. When the inner ring of the cylindrical roller bearing 37 is pressed against the frustum of the spindle 17 by means of a nut 39, said ring enlarges slightly. Zero-clearance mounting of the spindle 17 can be thus achieved during assembly. It may even be advantageous if a certain amount of preloading is set by tightening the nut 39 accordingly.

Due to this design, zero-clearance and, in the radial direction, extremely resilient mounting of the spindle 17 or of the tool (not shown) clamped in the tool holding fixture 25 is achieved in the region of the tool holding fixture 25. This is, inter alia, very important for hob peeling in order to achieve good machining quality.

In FIG. 4, a second bevel gear 41 adjoins the cylindrical roller bearing 37 on the right-hand side. The second bevel gear 41 is also connected to the spindle 17 for conjoint rotation by means of one or more feather keys 43.

In order for the second bevel gear 41 to be connected to the spindle 17 without rotational backlash, a conical recess 45 is formed in the spindle 17 opposite the feather key 43. A threaded hole 47 is formed in the second bevel gear 41, slightly offset from this conical recess 45. The offset between the recess 45 and the threaded hole 47 is provided both in the axial direction and in the circumferential direction.

Because of this slight offset between the recess 45 and the threaded hole 47, the second bevel gear 41 is braced against the feather key 43 and therefore also against the spindle 17 in the circumferential direction by screwing in the set screw 49. A backlash-free connection is thus produced. The same design is also included in the connection of the drive shaft 9 to the first bevel gear 33, but cannot be seen here as the set screws are offset from the feather key 43 by 90°.

FIG. 4 shows a spacer sleeve 51 to the right of the second bevel gear 41. Two angular contact ball bearings 53 adjoin said sleeve in an O-shaped arrangement and have a pressure angle γ.

The outer rings of the ball bearings 53 are supported against a step in the housing part 19. The inner ring of the left-hand ball bearing 53 in FIG. 4 is supported against the spacer sleeve 51. This design allows axial forces to be transmitted, resulting in stiff axial mounting of the spindle 17. The spindle can absorb large axial forces by means of bearings having a pressure angle γ>25°, and therefore forms a very stiff axial mounting.

For reasons relating production and/or assembly, the housing 19 is formed in three parts. The largest part is denoted by 19.1 and supports the mounting of the spindle 17. Below this housing part 19.1 is a second housing part 19.2. In FIG. 4, a third housing part 19.3 is present on the right-hand end of the first housing part 19.1 and substantially houses the brake 55.

In the embodiment shown, the brake 55 is designed as a multi-plate coupling, in which a second group of plates 59 is rotatably connected to the spindle 17 for conjoint rotation and a first group of plates 57 is connected to the third housing part 19.3 or the first housing part 19.1.

A support element (having no reference numeral) supports the first group of plates 57 in the housing 19.3. Correspondingly, the second group of plates 59 is fastened to the spindle 17. For the sake of clarity, only one plate, 57 or 59 as is the case, is provided with a reference numeral. The plates 57 and 59 are mutually spaced in the axial direction. The first plates 57 are connected to the housing 19 and the second plates 59 are connected to the spindle 17 for conjoint rotation.

Silicone oil (not shown) is located in the spaces between the plates 57 and 59. Owing to the shearing forces between the plates 57 and 59 and the silicone oil, a braking torque dependent on rotational speed is produced in the brake 55 as soon as the spindle 17 rotates.

Said braking torque also depends on the dimensions of the brake 55. It can be adjusted very easily by varying the filling amount of the silicone oil. Furthermore, the braking torque can be controlled by selecting the viscosity of the silicone oil. For this purpose, different silicone oils with different viscosities are available on the market. When the brake 55 is intended to be switched off, the silicone oil is simply removed from the housing or the brake 55. This results in an air gap between the plates 57 and 59 that has almost no braking action because the viscosity of air is extremely low.

In order to be able to discharge the heat produced in the brake 55 even when operating the drilling-milling device 1 continuously, the cooling-lubricant supply 27 of the drilling-milling device 1 is designed such that holes are provided in the housing 19 that surround the brake 55 especially in the third housing part 19.3. Said holes are part of the cooling-lubricant supply and therefore have reference numeral 27. The cooling-lubricant supply 27 ends in the rotational axis 15 of the spindle 17.

Figure 5:
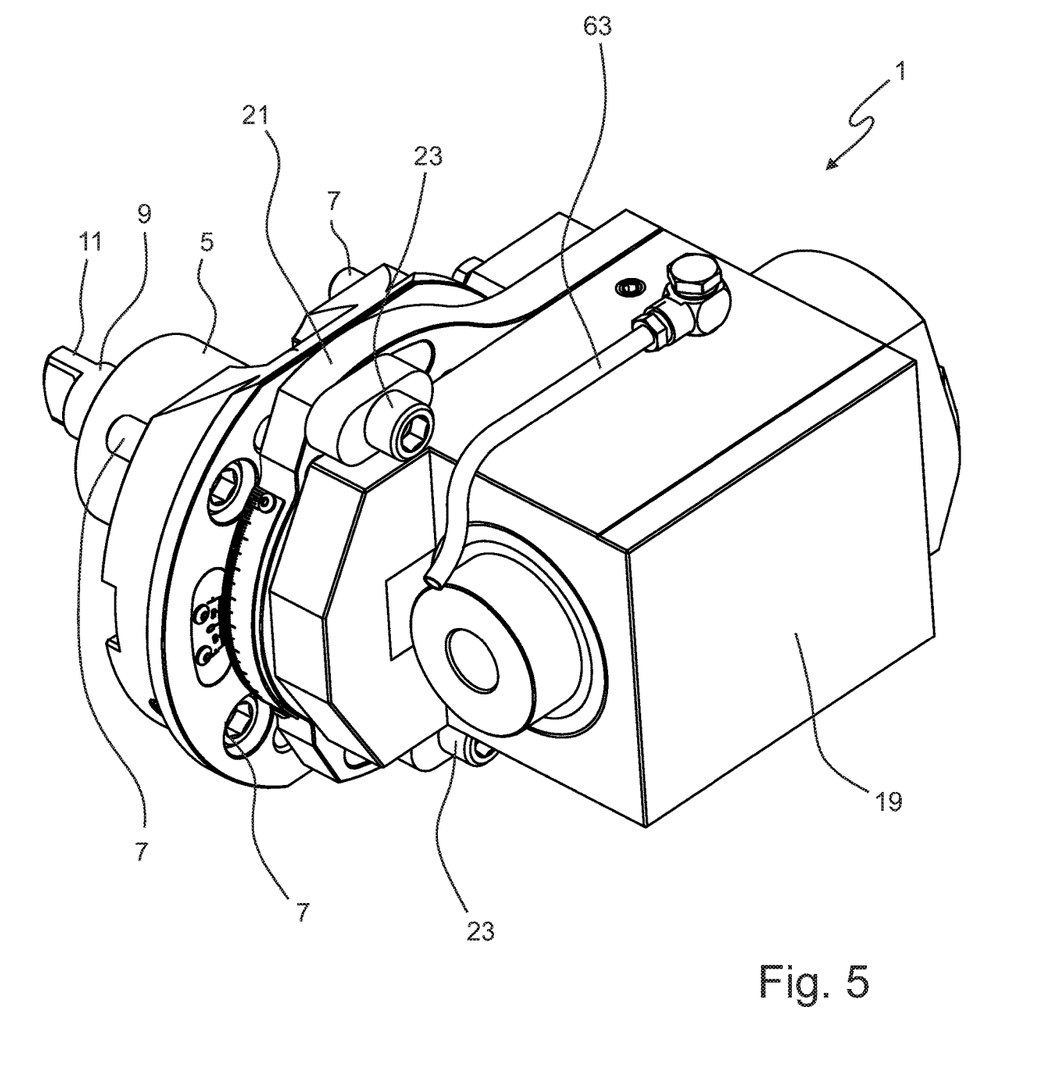
FIG. 5 is an isometric view of the drilling-milling device according to the invention.

In the embodiment shown, the spindle 17 is bored hollow such that the cooling lubricant, after cooling the brake 55, enters the region of the tool holding fixture 25 via a central through-hole 61 of the spindle 17. A corresponding hole that guides the cooling lubricant to the tool can be provided on the tool (not shown) in said region. Alternatively, it is also possible to guide the cooling lubricant outwardly and then direct it towards the workpiece. In FIGS. 2 and 5, this external continuation of the cooling-lubricant supply 27 is provided with reference numeral 63. In this embodiment, the cooling lubricant does not flow through the hole 61 in the spindle 17.

FIG. 5 is an isometric drawing of the drilling-milling device at an angle from above. In said drawing, three of the four fastening screws 7 by means of which the drilling-milling device 1 is screwed to a turret or another tool holding fixture (not shown) can be seen. They can be considered to be part of the mechanical interface 3. In this view, the clamping brackets and the clamping screws 23 by means of which the drilling-milling device 1 is screwed to the rotary table 21 can also be clearly seen.

Figure 6:
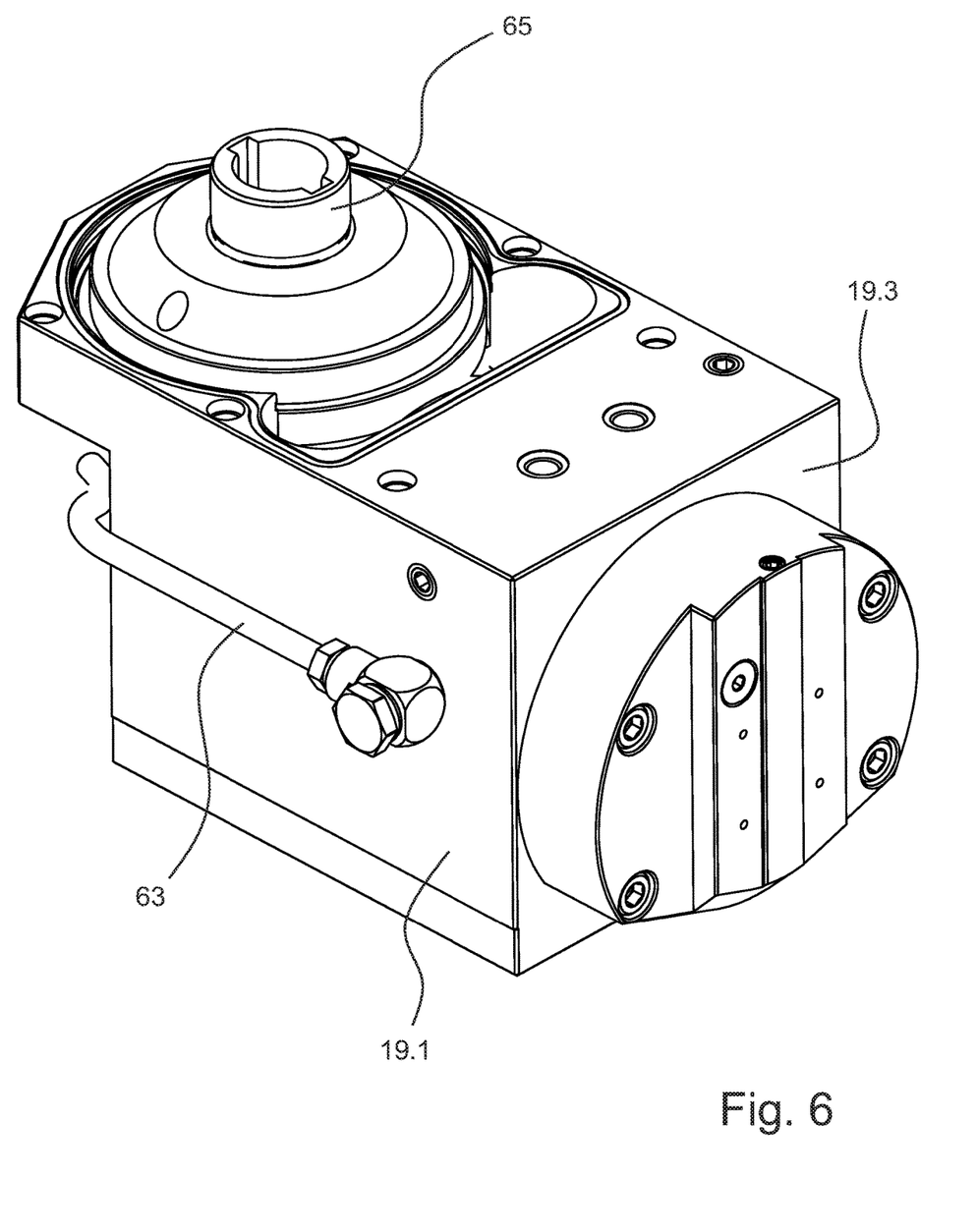
FIG. 6 is an isometric view of the housing of the drilling-milling device according to the invention from below.

In particular, it is clear from FIG. 6 that the lower face of the housing 19.1 is designed such that it interacts with the housing 19.2. A bearing seat that supports one of the angular contact ball bearings 29 (see FIG. 4) is denoted by reference numeral 65.

Figure 7:
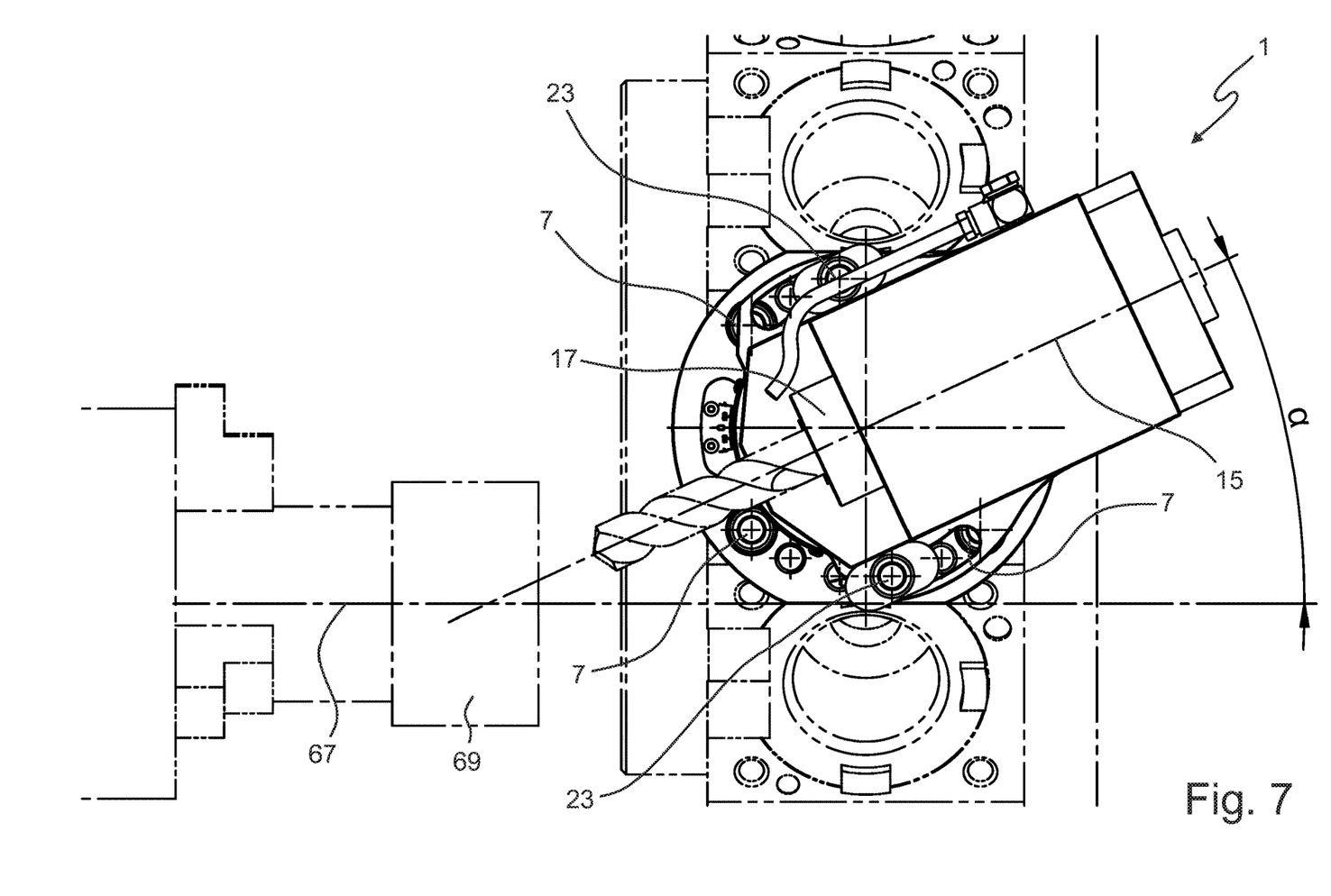
FIGS. 7 and 8 are additional views of the drilling-milling device according to the invention.
Figure 8:
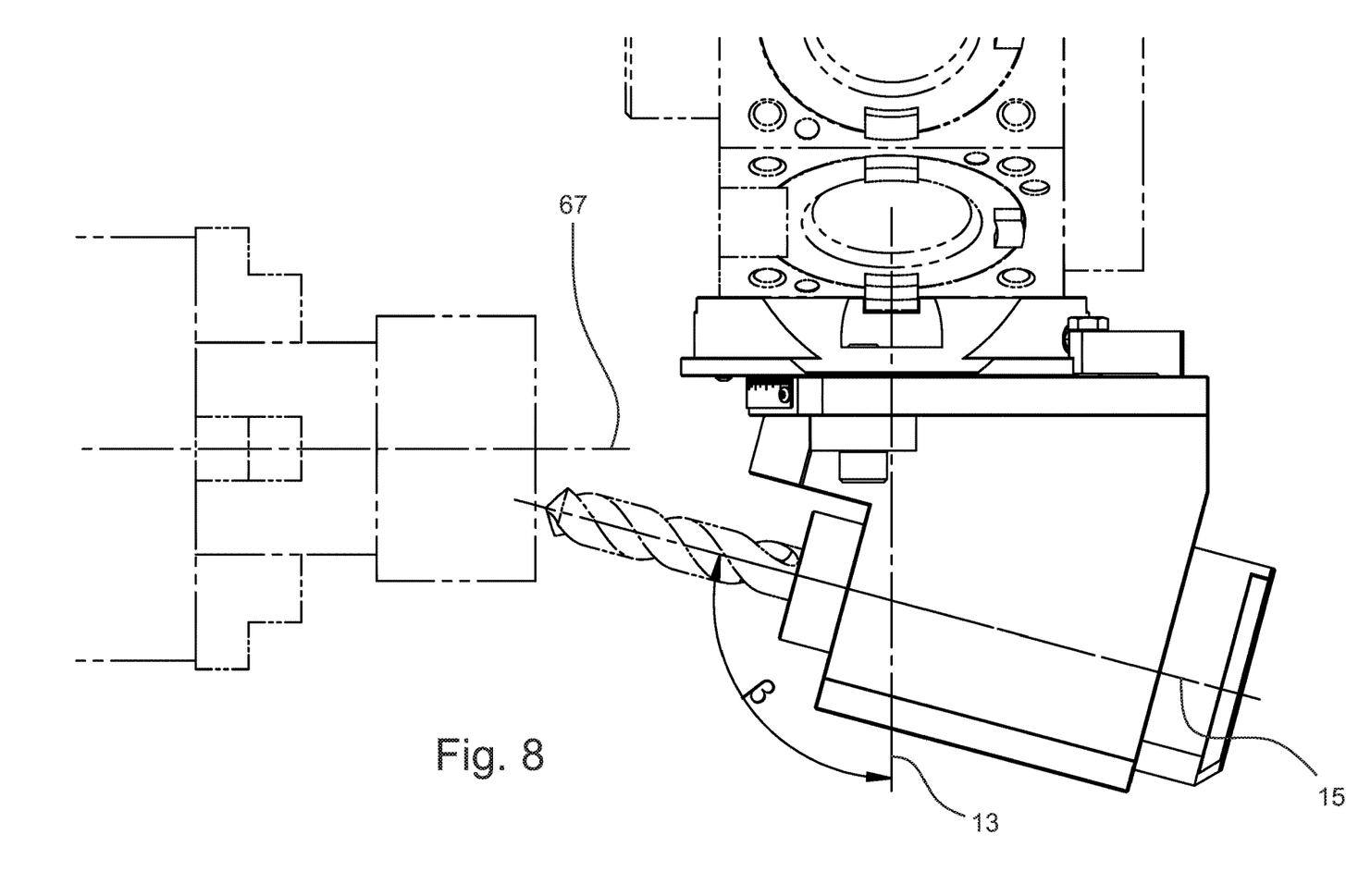
Figure 9:
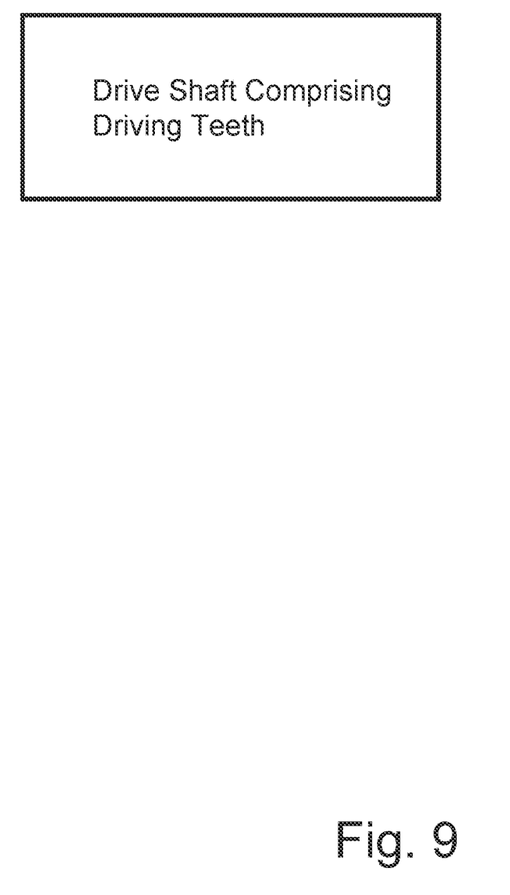
FIG. 9 schematically shows an alternative feature according to an embodiment of the invention.

FIGS. 7 and 8 show the angles α and R. Furthermore, by way of example, the arrangement of the drilling-milling device 1 on a turret and the position of said device relative to the workpiece 69 clamped in a jaw chuck is intended to be illustrated in an exemplary manner. As the turret and the workpiece 69 are not part of the invention, they are shown by way of dotted lines.

FIG. 7 is a plan view of the drilling-milling device 1 according to the invention. The rotational axis 15 of the spindle 17 and the rotational axis 67 of the main spindle of the numerically controlled machine tool include the pivot angle α. This means that slanted holes, surfaces or profiles can also be produced in the workpiece 69.

FIG. 8 is a side view of the drilling-milling device 1 according to the invention. The rotational axis 15 of the spindle 17 and the rotational axis 13 of the drive shaft 9 include the angle β.

The invention claimed is:

1. A drilling or milling device, said device comprising:
   a housing;
   a drive shaft;
   a tool spindle; and
   a brake including a first plurality of plates and a second plurality of plates;
   wherein
   the drive shaft and the spindle are coupled to one another by means of a gear mechanism,
   the first plurality of plates are connected to the housing, and
   the second plurality of plates are fastened to the spindle, resulting in a retarding force being applied to the spindle, due to the shear stress created by fluid located in gaps between the first plurality of plates and the second plurality of plates, where the shear stress is created due to rotation of the second plurality of plates relative to the first plurality of plates.

2. The device according to claim 1, wherein the spindle includes a tool receptacle at one end, and wherein the brake is located at an end of the spindle distal from the one end.

3. The device according to claim 1, wherein
   the brake is actively cooled.

4. The device according to claim 1, the device further comprising:
   a cooling-lubricant supply, wherein
   the brake is cooled by cooling lubricant flowing through the cooling lubricant supply.

5. The device according to claim 1, the device further comprising:
   a cooling-lubricant supply, wherein
   the brake is cooled by cooling lubricant flowing through the cooling-lubricant supply, and
   the cooling-lubricant supply comprises holes in the housing.

6. The device according to claim 1, the device further comprising:
   a cooling-lubricant supply, wherein
   the brake is cooled by cooling lubricant flowing through the cooling-lubricant supply, and
   the cooling-lubricant supply further comprises a hole in the spindle.

7. The device according to claim 6, the device further comprising, on a side of the device that is configured to be driven, a turret interface suitable for a turning center.

8. The device according to claim 1, wherein
   a side of the device that is configured to be driven is compatible with a receptacle of a turning or machining center.

9. The device according to claim 1, wherein
   the drive shaft comprises a dihedron or driving teeth.

10. The device according to claim 1, wherein an angle (β) between a rotation axis of the spindle and a rotation axis of the drive shaft deviates from 90°.

11. The device according to claim 1, the device further comprising:
    a pivoting means, wherein
    the spindle is pivotable about a rotational axis of the drive shaft by means of the pivoting means.

12. The device according to claim 1, wherein
    the spindle comprises a tool holding fixture.

13. The device according to claim 12, wherein
    the tool holding fixture is an expansion chuck.

14. The device according to claim 12, wherein
    the spindle is equipped with a roller bearing in a region of the tool holding fixture.

15. The device according to claim 1, wherein
    only one pair of gears of said gear mechanism is used for transmitting power between the drive shaft and the spindle.

16. The device according to claim 15, wherein
    first roller bearings mount the drive shaft,
    second roller bearings mount the spindle, and
    said first roller bearings including ball bearings or angular contact ball bearings, and
    said second roller bearings including angular contact ball bearings or cylindrical roller bearings.

17. The device according to claim 16, wherein
    the spindle is mounted, in a region of a tool holding fixture of the spindle, by means of said second roller bearings, and wherein said second roller bearings are in an O-shaped arrangement.

18. The device according to claim 1, wherein
    the fluid comprises an oil, a fat, or a rheological fluid.

* * * * *